April 22, 1952     A. G. ROSE     2,593,699
BOOSTER CONVEYER FOR GRAVITY CONVEYER SYSTEMS
Filed April 20, 1946     2 SHEETS—SHEET 2
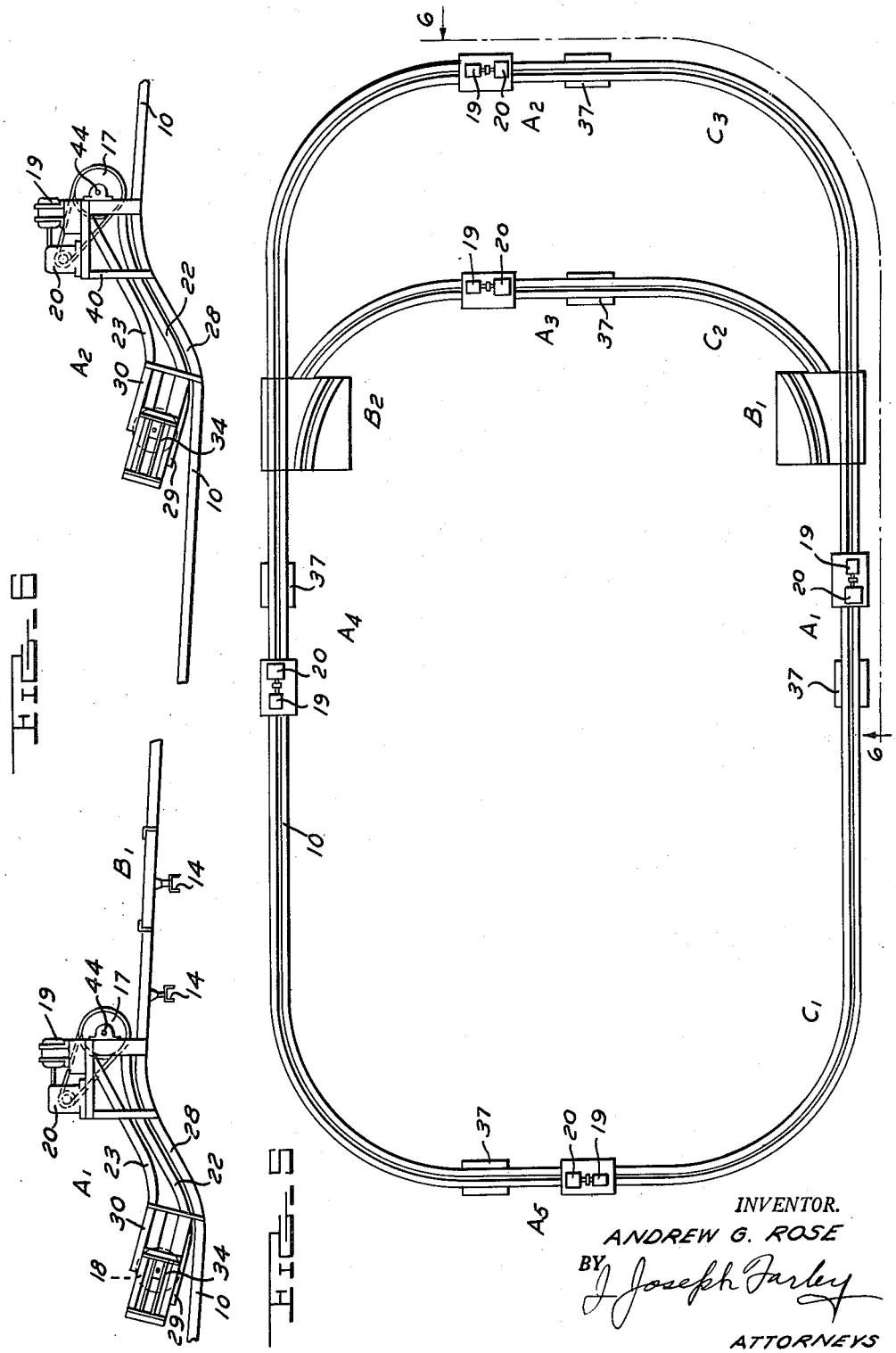
INVENTOR.
ANDREW G. ROSE
BY J. Joseph Farley
ATTORNEYS Patented Apr. 22, 1952

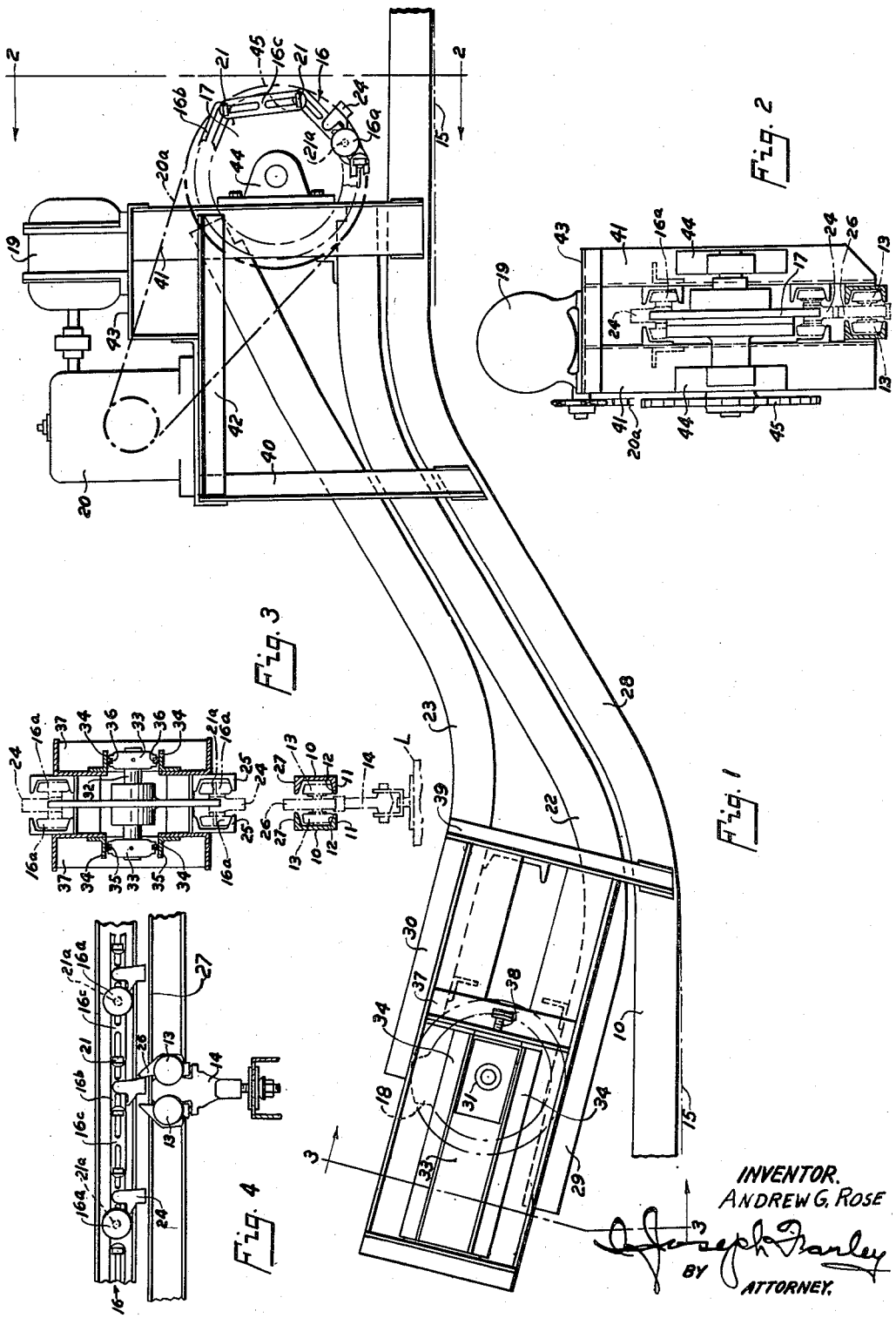

2,593,699

UNITED STATES PATENT OFFICE 2,593,699

BOOSTER CONVEYER FOR GRAVITY CONVEYER SYSTEMS

Andrew G. Rose, Detroit, Mich., assignor to Jervis B. Webb Company, Detroit, Mich., a corporation of Michigan Application April 20, 1946, Serial No. 663,708

6 Claims. (Cl. 104—94)

This invention relates to overhead conveyor systems and more particularly to a power driven booster conveyor for use in raising free trolleys from one track level to another.

In the conventional overhead conveyor system, a power driven chain may be provided throughout the length of the conveyor line with means for connecting such chain to the load carrying trolleys. Such connecting means may be of a fixed type or, where the conveyor system is provided with branch tracks leading to and from a main conveyor track, the driving connection may be severable as with pusher dogs provided in the power chain to engage driven dogs provided in free trolleys.

While such continuous power conveyor systems are very satisfactory from an operational standpoint, their cost in comparison with the hand pushed or gravity type of free trolley conveyor system is necessarily relatively high. On the other hand, the latter systems are normally subject to certain limitations as where the track level must be raised from one floor to another, or in the case of a gravity system, where the length of travel of the conveyor line is such that the level of the track must be raised at certain intervals where the track approaches too close to the floor level.

By providing a power driven means for propelling the free trolleys along such upwardly inclined sections of track, these limitations may be overcome while retaining basic economies over the continuous power conveyor system.

It is the principal object of the present invention to provide means for propelling free trolleys while traveling on upwardly inclined sections of a conveyor track.

Another object of the invention is to incorporate the use of a power driven chain in propelling such trolleys.

A further object of the invention is to provide means for causing engagement of driving means between the power chain and free trolleys at the entrance to an upwardly inclined section of the track and for causing the disengagement of such means at the exit to such inclined section.

Another object of the invention is to provide means for holding such power chains in a position for driving engagement while the trolleys are on such upwardly inclined track sections.

A further object of the invention is to provide anti-friction means for permitting the power chain to be guided with a minimum of frictional resistance.

These and other objects of the invention will appear more clearly from the following detailed description of a particular embodiment of the invention and from an examination of the drawings forming a part hereof and wherein, Fig. 1 is a side elevation of the conveyor track and booster arrangement at an upwardly inclined section of the conveyor track.

Fig. 2 is an end elevation taken along the line 2—2 of Fig. 1.

Fig. 3 is an end elevation taken along the line 3—3 of Fig. 1.

Fig. 4 is a side elevation of the power chain in driving engagement with a trolley bracket, the nearer portion of the tracks for the power chain and free trolleys being omitted.

Fig. 5 is a diagrammatic plan view of a gravity conveyor layout employing a plurality of booster sections as required at intervals where the track level is raised.

Fig. 6 is a side elevation taken along the line 6—6 of Fig. 5.

In the layout shown in Fig. 5, five booster sections are employed identified as A1 to A5 respectively. Track switches B1 and B2, which may be operated by well known manual or power means not shown, serve to connect a main conveyor loop C1 with either of branch lines C2 or C3. It is apparent that by using proper spacing of the booster sections A1-A5 and slope in the track, as indicated in Fig. 6, free load trolleys 14 may be continuously circulated throughout desired alternate routes of the conveyor system and adapted for whatever operation might be desired along the respective paths, thereby providing a very flexible "power and free" sytem without involving the expense of a continuous power line throughout the conveyor system.

With reference to these figures, the conveyor track 10 comprises two opposed channel members of which the upper surfaces 12 of the lower flanges 11 form a path for trolley wheels 13 to roll on. The trolley bracket 14 supported by such wheels extends downwardly between the bottom flanges 11 of the conveyor track and is provided with any suitable well-known means or devices for supporting or carrying a load L. As the conveyor track 10, in this case is shown as a gravity conveyor system, it is constructed with a gradual downward slope as indicated by the horizontal lines 15, such slope being sufficient to permit the force of gravity exerted on the free trolleys and their loads to move them along the conveyor track.

At any suitable point or points along the conveyor's line of travel where it is necessary or desirable to raise the line to a higher position above the floor or to a higher floor, a booster conveyor is provided. Such conveyor has an endless power chain 16 that travels around a sprocket 17 at the upper level and a sprocket 18 at the lower level of the conveyor track 10. A motor 19, through a set of reduction gears 20, and a chain and sprocket transmission 20a drives the upper sprocket 17 in a counter-clockwise direction. The power chain 16, of the type variously called "Keystone," "Rivetless" or "Weston" chain and originally disclosed in the Weston Patent No. 870,704, consists of a plurality of alternately arranged "center links" 16b and "side bars" 16c. Each center link 16b consists of an integral piece of metal having an elongated slot at each end. A pair of side bars 16c each having an elongated slot at each end is pivotally connected to each end of said center link by headed locking pins 21, the heads seating in a transversely extending recess on the outer face of each end of said side bars 16c. At spaced intervals, however, special locking pins 21a are provided with cylindrical extensions to serve as journals for rotatable chain wheels 16a.

A lower chain track 22 and upper chain track 23 each constructed of opposed structural channel members similar to those used for the conveyor track 10 serves to guide the power chain 16, the upper and lower flanges of such channel members providing a track for the wheels 16a to ride on. Pusher dogs 24 are suitably carried by the chain 16 at longitudinally spaced intervals and extend downwardly between the lower flanges 25 of the lower chain track 22. Each free trolley 14 is provided with a pair of dogs 26 extending upwardly between the upper flanges 27 of the conveyor track 10. The lower chain track 22 is formed and assembled parallel to the upwardly inclined portion 28 of the conveyor track 10 and is relatively spaced with respect to such conveyor track so as to provide for an overlapping driving engagement between a pusher dog 24 and the dog 26 whereby movement of the chain 16 is imparted to the trolley 14 and load suspended therefrom. Above the approach to the booster conveyor of the conveyor track 10, a portion 29 of the lower chain track 22 is inclined downwardly toward the conveyor track 10 thus causing the power chain 16 and the driving dogs 24 carried thereon to be gradually lowered to a driving level behind the dog 26 of any load carrying bracket member 14 which enters the approach to the inclined section 28 of the conveyor track 10.

Such arrangement provides for a substantial interval of engagement before entering the upwardly inclined section which avoids the possibility of a loaded trolley traveling into the upward curve and then falling back without engagement by the drive chain. Such arrangement also facilitates take-up adjustment of the drive chain.

The upper chain track 23, which extends between the upper surface of the sprockets 17 and 18, is formed at its lower end 30 parallel to the downwardly inclined portion 29 of the lower chain track 22. In order to provide take-up for the power chain 16, the lower sprocket 18 is mounted in bearings 31 by means of a transverse shaft 32 and the bearings 31 are in turn mounted in slidable rectangular block members 33 each of which is slidably positioned between two angle members 34. A longitudinal groove 35 (see Fig. 3) on either edge of the block members 33 provides a keyway for a key 36 provided on the angle members 34. Two angle members 37 mounted in front of the block members 33 are each provided with a take-up screw 38 for adjusting the longitudinal location of each of said rectangular block members 33.

Relative spacing and support for the chain tracks 22 and 23 and conveyor track 28 is provided by vertical angle members 39, 40 and 41 attached to the sides of the respective track members. The latter members 40 and 41 also serve to support a platform 42 and 43 for the gear reducer 20 and motor 19 respectively. Journals 44 of the sprocket 17 and the sprocket drive wheel 45 are also mounted on the vertical angle members 41.

While the conveyor system is in operation, the motor 19 through gear reducer 20 and chain and sprocket transmission 20a continuously drives sprocket 17 in a counter-clockwise direction causing the power chain 16 to be continuously in motion. Thus, when any load carrying trolley 14 enters the approach to the upwardly inclined conveyor track section 28, it is automatically engaged by the dogs 24 of the booster conveyor and propelled to the new level. By providing an upwardly inclined section and booster such as described above at intervals in the conveyor track as required, a gravity conveyor line of any length may be provided.

While a particular embodiment of my invention has been described herein, it may be readily understood that numerous changes in the detailed construction thereof may be resorted to without departing from the spirit of the invention as defined in the following claims.

I claim:

1. A trolley conveyor system characterized by an endless trolley track, a plurality of power driven trolley boosters along said track, said track being inclined downwardly from the exit end of any booster station to the entrance end of the next succeeding booster station, gravity providing the sole trolley propelling force between said booster stations.

2. An industrial trolley conveyor system for transporting work loads comprising an endless track, generally free load carrying trolleys adapted to travel along said track, said track having relatively steep upwardly inclined and gradual downwardly inclined sections, a power driven booster at each upwardly inclined section adapted to engage trolleys as they approach said section, to propel them to the top of said section and thereupon discharge them onto the adjacent downwardly inclined section, gravity providing the sole trolley propelling force on each downwardly inclined section.

3. An overhead trolley conveyor system for transporting work loads in an industrial plant characterized by an endless track, generally free load carrying trolleys adapted to travel along said track, a plurality of relatively steep upwardly inclined sections in said track joined by a plurality of gradual downwardly inclined sections, a power driven booster at each upwardly inclined track section adapted to engage approaching trolleys, propel them up said track section and discharge them onto the adjacent downwardly inclined section, gravity providing the sole propelling force for said trolleys between said booster stations.

4. An overhead trolley conveyor system for transporting work loads in an industrial plant comprising an endless track, generally free load carrying trolleys adapted to travel along said track, said track having a plurality of relatively steep upwardly inclined sections joined by a plurality of downwardly inclined sections, an endless power driven chain adjacent each of said upwardly inclined sections, sprocket members for driving and changing the direction of said chain, and cooperating members on said chain and trolleys for causing said chain to drivingly engage approaching trolleys and propel them to the higher level of said track, gravity providing the sole trolley propelling force between booster stations.

5. An overhead trolley conveyor system for transporting work loads in an industrial plant comprising an endless track, generally free load carrying trolleys adapted to travel along said track, said track having a plurality of relatively steep upwardly inclined sections joined by a plurality of downwardly inclined sections, an endless power driven chain adjacent each of said upwardly inclined sections, sprocket members for driving and changing the direction of said chain, cooperating members on said chain and trolleys for causing said chain to drivingly engage approaching trolleys and propel them to the higher level of said track, and a chain track positioned substantially parallel to said upwardly inclined section of conveyor track for guiding the driving portion of said chain into driving engagement with approaching trolleys and maintaining said engagement throughout their travel up said conveyor track section, and until the trolleys reach the adjacent downwardly inclined conveyor track section, gravity providing the sole trolley propelling force between booster stations.

6. An overhead trolley conveyor system for transporting work loads in an industrial plant comprising an endless track, generally free load carrying trolleys adapted to travel along said track, said track having a plurality of relatively steep upwardly inclined sections joined by a plurality of downwardly inclined sections, an endless power driven chain adjacent each of said upwardly inclined sections, sprocket members for driving and changing the direction of said chain, cooperating members on said chain and trolleys for causing said chain to drivingly engage approaching trolleys and propel them to the higher level of said track, and a chain track positioned substantially parallel to said upwardly inclined section of conveyor track for guiding and holding the driving portion of said chain in driving engagement with said trolleys throughout their travel along said upwardly inclined track section, a portion of said chain track adjacent to the approach to said upwardly inclined section of conveyor track being inclined toward said conveyor track in a manner whereby the chain passing through said portion will be gradually brought into driving position with respect to trolleys approaching said upwardly inclined section thereby insuring entrapment of each trolley by the time its momentum is expended on the upwardly inclined section of the track, gravity providing the sole trolley propelling force between booster stations.

ANDREW G. ROSE.

REFERENCES CITED

The following references are of record in the file of this patent:

UNITED STATES PATENTS

| Number | Name | Date |
|---|---|---|
| 870,704 | Weston | Nov. 12, 1907 |
| 1,127,753 | Glynn | Feb. 9, 1915 |
| 1,585,605 | Russo | May 18, 1926 |
| 1,920,774 | Webb | Aug. 1, 1933 |
| 1,921,109 | Webb et al. | Aug. 8, 1933 |
| 1,949,691 | Nehrer et al. | Mar. 6, 1934 |
| 1,994,032 | Angerpointer | Mar. 12, 1935 |
| 2,058,804 | Knies | Oct. 27, 1936 |
| 2,116,430 | Gordon | May 3, 1938 |

FOREIGN PATENTS

| Number | Country | Date |
|---|---|---|
| 41,752 | France | Jan. 16, 1933 |
| 23,921 | Great Britain | May 22, 1913 |
| 428,860 | Great Britain | May 7, 1935 |